UNITED STATES PATENT OFFICE 2,480,111

BENZANTHRONYLAMINO-THIOPHANTHRA-QUINONE COMPOUNDS

Clarence F. Belcher, Bridgeton, N. J., and Lorraine A. Mero, Wilmington, Del., assignors to E. I. du Pont de Nemours & Company, Wilmington, Del., a corporation of Delaware No Drawing. Application November 15, 1947, Serial No. 786,337

4 Claims. (Cl. 260—329)

This invention relates to the preparation of new compounds containing the thiophanthraquinone nucleus, which are particularly valuable as dye intermediates. The invention relates more particularly to the preparation of new compounds of the benzanthronyl-amino-thiophanthraquinone series which are represented by the general formula:

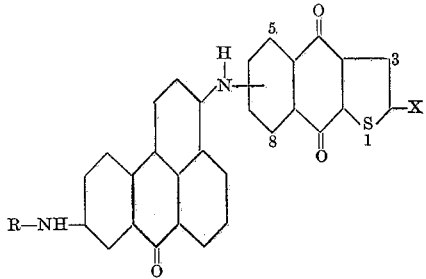

in which R stands for a radical of the group consisting of the anthraquinonyl and thiophanthraquinonyl radical and wherein the thiophanthraquinonyl radical in each case is attached to the -N- in the 5- or 8-position, and X stands for hydrogen or halogen.

It is an object of this invention to provide new and valuable compounds particularly suitable for use as dye intermediates containing the thiophanthraquinone nucleus attached to the Bz-group of the benzanthrone molecule through an amino linkage in the 5- or 8-position and in which the benzene molecule carries in the 6-position an anthraquinonylamino or thiophanthraquinonylamino radical.

The compounds of this invention may be prepared by condensing one mol of alpha-aminothiophanthraquinone with 6-Bz-1-dihalogenbenzanthrone (preferably the dibromobenzanthrone) and condensing the resulting product with alpha-amino-anthraquinone or by condensing one mol of the 6-Bz-1-dihalogen-benzanthrone with two mols of the 5- or 8-aminothiophanthraquinone. The condensation of the halogen-benzanthrones and the aminoanthraquinone or the aminothiophanthraquinone are carried out by the methods ordinarily used in condensing aminoanthraquinones with halogen-anthraquinones or halogen-benzanthrones. The condensation may be carried out under a wide variety of conditions as to temperature and time, depending upon the particular reactants used. A temperature range of 185°–215° C. usually gives most satisfactory results, although temperatures outside of this range may occasionally be employed. The time of the reaction depends upon the temperature chosen and the particular reactants. The condensations are preferably carried out in inert organic solvents such as aromatic hydrocarbons, and chlorinated or nitrated aromatic hydrocarbons. Condensation is effected by any of the usual methods employing acid binding agents such as inorganic or organic bases and catalysts such as copper salts.

The following examples are given to illustrate the invention. The parts used are by weight, unless otherwise specified.

Example 1

A mixture of 180 parts of nitrobenzene, 15 parts of 6,Bz-1-dibromobenzanthone, 8.85 parts of 5-aminothiophanthraquinone, 5 parts of soda ash and 0.5 part of cuprous chloride are heated at 200°–205° C. for eight hours. The charge is cooled to 100° C., then 5 parts more of soda ash and 8.7 parts of 1-aminoanthraquinone are added and the mixture is heated at reflux for twenty hours. The charge is filtered at 80–90° C., and the product is washed with hot nitrobenzene, reslurried in 85 parts of nitrobenzene at 140°–145° C., filtered at 80° C., washed with nitrobenzene, alcohol, water, and dried. The 6-[1-anthraquinonylamino]-Bz-1-[5-thiophanthraquinonylamino] benzanthone, obtained in the form of large, dark, violet-colored needles, may be represented by the formula:

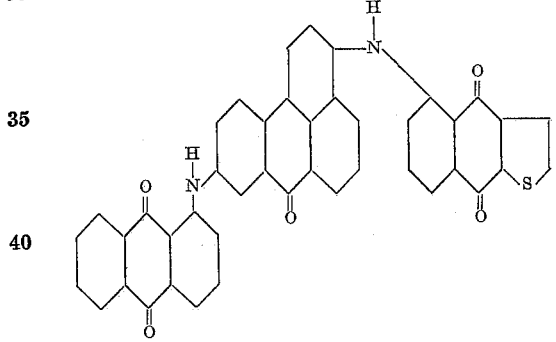

Example 2

A mixture of 130 parts of nitrobenzene, 13 parts of 6,Bz-1-dibromobenzanthrone, 15.5 parts of 5-aminothiophanthraquinone, 8.8 parts of soda ash and 0.65 part of cuprous chloride is heated at reflux for 16 hours. The charge is filtered at 80° C., and after the cake has been washed with hot nitrobenzene it is reslurried in 70 parts of nitrobenzene at 100° C. The violet-colored needle-like 6,Bz-1-di[5-thiophanthraquinonylamino]-benzanthrone is filtered off at 80

C., washed with nitrobenzene, alcohol, water, and dried. It may be represented by the formula:

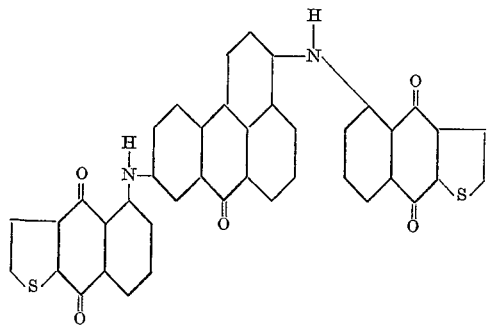

*Example 3*

A mixture of 100 parts of nitrobenzene, 8.4 parts of 6,Bz-1-dibromobenzanthrone, 5 parts of 8-aminothiophanthraquinone, 5 parts of soda ash and 0.28 part of cuprous chloride is heated at 200°–205° C. for eight hours. The charge is cooled to 100° C., after which 5 parts of 1-aminoanthraquinone are added. The charge is heated at reflux for twenty hours and then filtered at 80°–90° C. The red-brown product is washed with nitrobenzene, reslurried in nitrobenzene at 140°–145° C., filtered at 80° C., washed with nitrobenzene, alcohol and water, and dried. The resulting 6 - [1 - anthraquinonylamino]-Bz-1-[8-thiophanthraquinonylamino] benzanthrone may be represented by the formula:

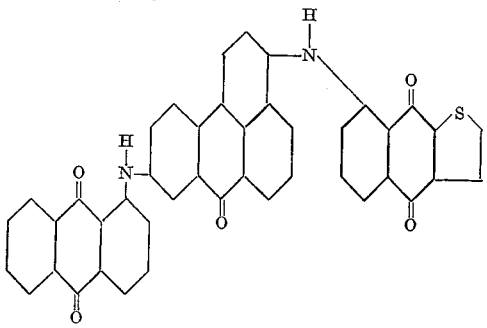

In place of the dibromobenzanthrone employed in the above examples, the 6,Bz-1-dichlorobenzanthrone may be substituted therefor. The 2-chloro- or 2-bromo-5-aminothiophanthraquinone may be employed in place of the alpha-aminothiophanthraquinones in the above examples, in which case the condensation products containing halogen in the 2-position of the thiophanthraquinonyl radical are obtained. More specifically, 6,Bz-1-dibromobenzanthrone may be condensed with two mols of 8-aminothiophanthraquinone; 6,Bz-1-dibromobenzanthrone may be condensed with one mol of 2-chloro-5-aminothiophanthraquinone and one mol of alpha-aminoanthraquinone; 6,Bz-1-dibromobenzanthrone may be condensed with mixtures of the 5- and 8-aminothiophanthraquinones; 6,Bz-1-dibromobenzanthrone may be condensed with one or two mols of the 2-bromo-5-aminothiophanthraquinone or the 2-bromo-8-aminothiophanthraquinone or with one mol of the 2-halogen-5-aminothiophanthraquinone and one mol of alpha-aminoanthraquinone.

The aminothiophanthraquinones employed may be prepared by the process more particularly described in co-pending application of Lee & Weinmayr Serial No. 723,672 filed January 22, 1947.

The new compounds of this invention, which are benzanthronyl-aminothiophanthraquinones substituted in the 6-position of the benzanthraquinonyl group by the anthraquinonylamino or thiophanthraquinonylamino groups, are of particular value as intermediates for the preparation of dyes. When treated with alcoholic caustic alkalies, they are converted to valuable new dyes which show very marked and unexpected depth in shade over analogous anthraquinonylaminobenzanthrone compounds and show exceptional light fastness. These compounds are more particularly illustrated in our co-pending application Serial No. 786,338 filed November 15, 1947, now Patent 2,480,112.

The 2-halogen-5-aminothiophanthraquinones employed as the starting materials in the preparation of the new compounds of this invention may be produced by the following process:

113 parts of 2-carbomethoxy-3-nitrobenzoic acid, 115 parts of phosphorous pentachloride and 250 parts of dry benzene are mixed (rather carefully). The mixture is heated to 65° C. for 10 minutes to form the acid chloride, then cooled to 10° C., and 143 parts of anhydrous stannic chloride are slowly added, followed by a mixture of 89 parts of 2-chloro-thiophene in 250 parts of benzene. The mixture is then stirred at 10°–15° C. for two hours and carefully poured into a mixture of 250 parts of ice water and 50 parts of concentrated hydrochloric acid. The benzene is removed by steam distillation, and the resulting aqueous suspension is cooled and filtered. The filter cake is slurried in a mixture of 500 parts of water, 500 parts of 95% alcohol and 200 parts of 30% sodium hydroxide solution for 18 hours to saponify the methyl ester. The resulting slurry is diluted with 3000 parts of water, filtered, acidified with hydrochloric acid and dried.

94 parts of the above product are dissolved in 683 parts of water containing 60 parts of 30% sodium hydroxide, at room temperature. This solution is added to a mixture of 583 parts of water, 147 parts of iron powder and 63 parts of $FeSO_4.7H_2O$ during the course of 40 minutes at 95° C. The mixture is agitated for 10 minutes at 95° C., then 35 grams of sodium carbonate are slowly dusted in while cooling to 80° C. The hot solution is filtered, the filter cake washed with sufficient hot (90° C.) water to yield a clear filtrate, the combined filtrates are run slowly into a cold (10° C.) solution of 28.6 parts of 96% sulfuric acid in 415 parts of water. The resulting slurry is stirred for 90 minutes at 10°–15° C., filtered cold, washed with ice water and dried.

The resulting product is then cyclized to the 5-amino-2-chloro - thiophanthraquinone by the following procedure:

73 parts of the above amino acid are slowly added to a mixture of 770 parts of 96% sulfuric acid and 150 parts of boric acid at 125°–130° C. The reaction mixture is held at this temperature for 15 minutes, cooled to 60° C., and at that temperature carefully diluted with 3000 parts of water to precipitate the 5-amino-2-chloro-thiophanthraquinone. The reaction mixture is cooled to room temperature, filtered and washed acid-free. The resulting wet filter cake is slurried in 2000 parts of water containing 100 parts of sodium carbonate for 15 minutes at 60°–70° C. It is then filtered, washed alkali-free and dried. The product is recrystallized from 10 parts of ortho-dichlorobenzene to yield the substantially pure 5-amino-2-chloro-thiophanthraquinone melting at 222°–223° C.

The 5-amino-2-bromo-thiophanthraquinone may be made in the same manner, starting with the 2-bromothiophene.

We claim:

1. The benzanthronylamino-thiophanthraquinones of the formula:

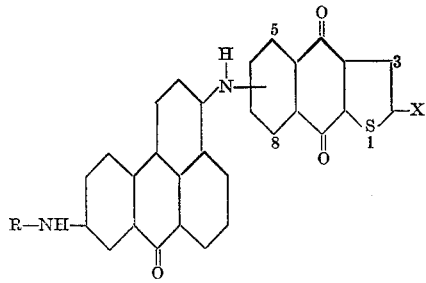

in which R stands for a group consisting of the anthraquinonyl and thiophanthraquinonyl radical wherein the thiophanthraquinonyl radical in each case is attached to the

in one of the positions 5 and 8, and X stands for hydrogen or halogen.

2. The benzanthronylamino-thiophanthraquinone of the formula:

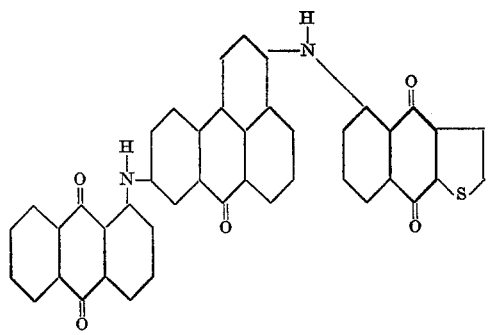

3. The benzanthronylamino-thiophanthraquinone of the formula:

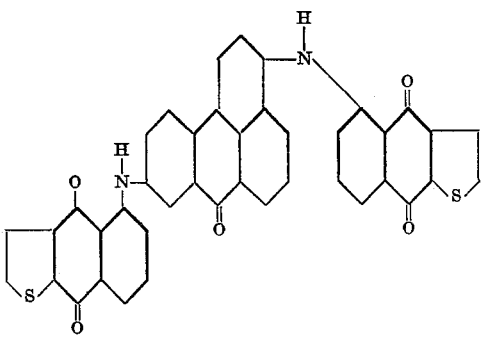

4. The benzanthronylamino-thiophanthraquinone of the formula:

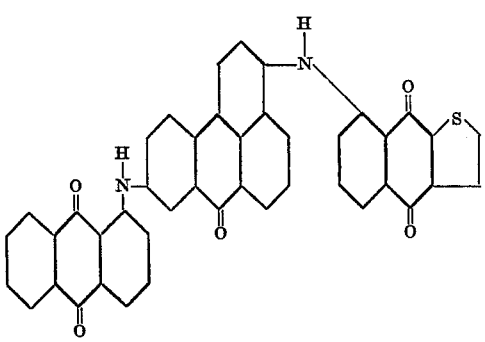

CLARENCE F. BELCHER.
LORRAINE A. MERO.

No references cited.